United States Patent [19]
Townsend

[11] Patent Number: 5,265,496
[45] Date of Patent: Nov. 30, 1993

[54] CLAMP-ON AERO BAR WITH INTERNAL CLAMPING MECHANISM FOR ATTACHMENT TO A BICYCLE HANDLEBAR

[76] Inventor: Ricky Townsend, 609 E. Simpson, Lafayette, Colo. 80026

[21] Appl. No.: 903,724

[22] Filed: Jun. 24, 1992

[51] Int. Cl.⁵ .......................... B62K 21/12; F16B 7/00
[52] U.S. Cl. ...................................... 74/551.8; 403/7; 403/234; 403/237
[58] Field of Search ................. 74/551.8, 551.9, 551.1; 403/7, 191, 234, 237; 280/288.4

[56] References Cited

U.S. PATENT DOCUMENTS

| | | | |
|---|---|---|---|
| 535,256 | 3/1895 | Marty | 74/551.3 |
| 3,942,822 | 3/1976 | Lewis | 280/289 |
| 4,354,399 | 10/1982 | Katayama | 74/551.1 |
| 4,459,871 | 7/1984 | Shimano | 74/551.9 X |
| 4,750,754 | 6/1988 | Lennon | 74/551.8 X |
| 4,873,886 | 10/1989 | Renner | 74/551.8 |
| 4,878,397 | 11/1989 | Lennon | 74/551.9 X |
| 5,000,469 | 3/1991 | Smith | 74/551.8 X |
| 5,145,210 | 9/1992 | Lennon | 74/551.8 X |
| 5,163,339 | 11/1992 | Giard et al. | 74/551.8 X |
| 5,195,394 | 3/1993 | Latta | 280/288.4 X |

FOREIGN PATENT DOCUMENTS

| | | | |
|---|---|---|---|
| 601729 | 8/1934 | Fed. Rep. of Germany . | |
| WO91/04903 | 4/1991 | PCT Int'l Appl. | 74/551.3 |
| 13053 | of 1896 | United Kingdom . | |
| 12218 | of 1897 | United Kingdom . | |
| 583356 | 12/1946 | United Kingdom | 74/551.8 |
| 2028411 | 3/1980 | United Kingdom | 403/237 |

OTHER PUBLICATIONS

Scott Martin, "Bullet Bars, A Buyer's Guide to 11 Aero Models", Bicycling Magazine, Aug. 1983, pp. 102–106.

*Primary Examiner*—Rodney H. Bonck
*Attorney, Agent, or Firm*—John R. Flanagan

[57] ABSTRACT

A clamp-on aero bar for mounting on top portions of the handles of a road-type bicycle handlebar includes a pair of elongated curved hollow handle adapter portions and a pair of internally-adjustable clamping mechanisms. The internally-adjustable clamping mechanism are connected to the hollow handle adapter portions and are disposed substantially internally thereof such that a tool must first be extended through an opening in each of the handle adapter portions in order to reach and respectively tighten or untighten the internal clamping mechanism.

14 Claims, 3 Drawing Sheets

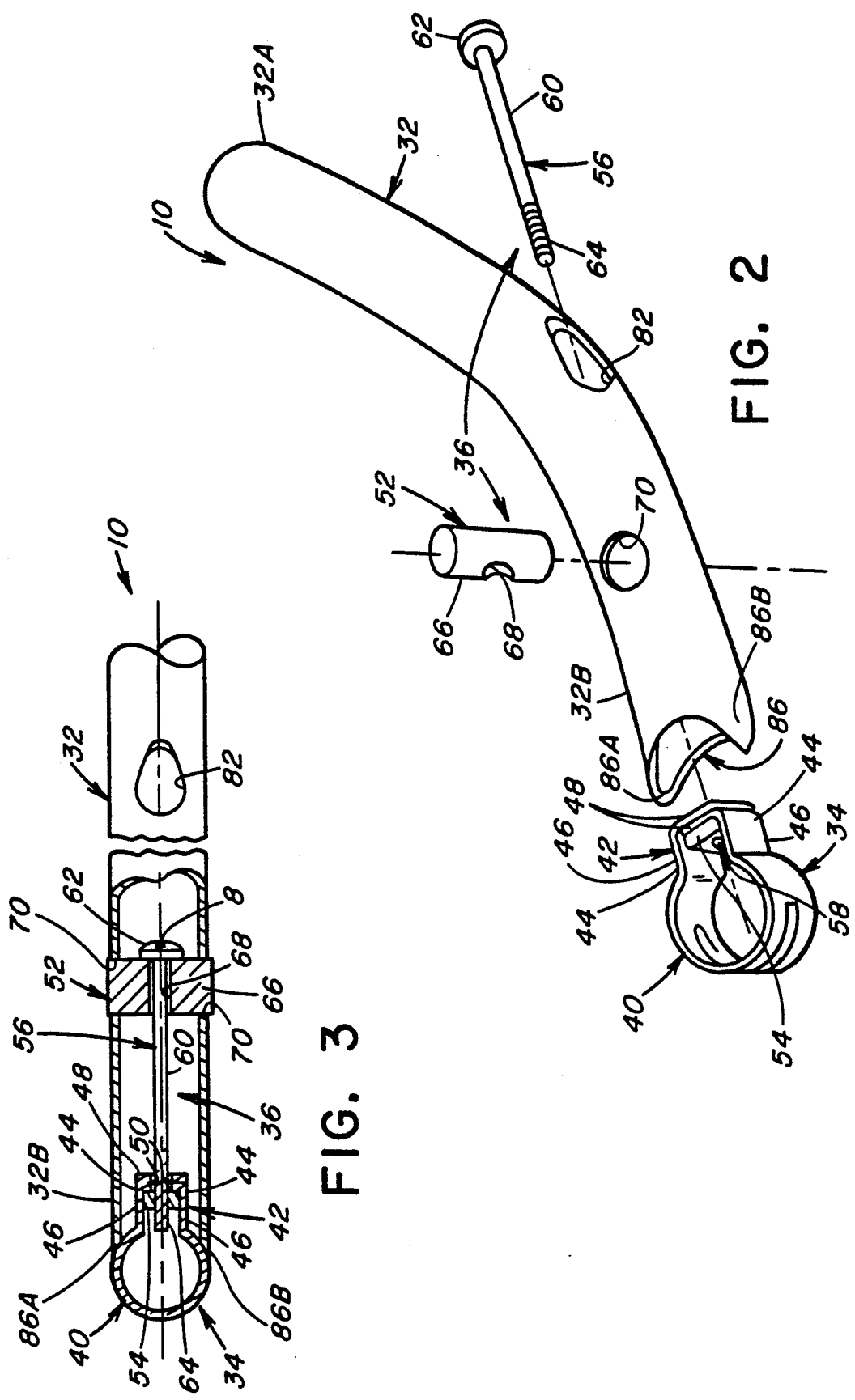

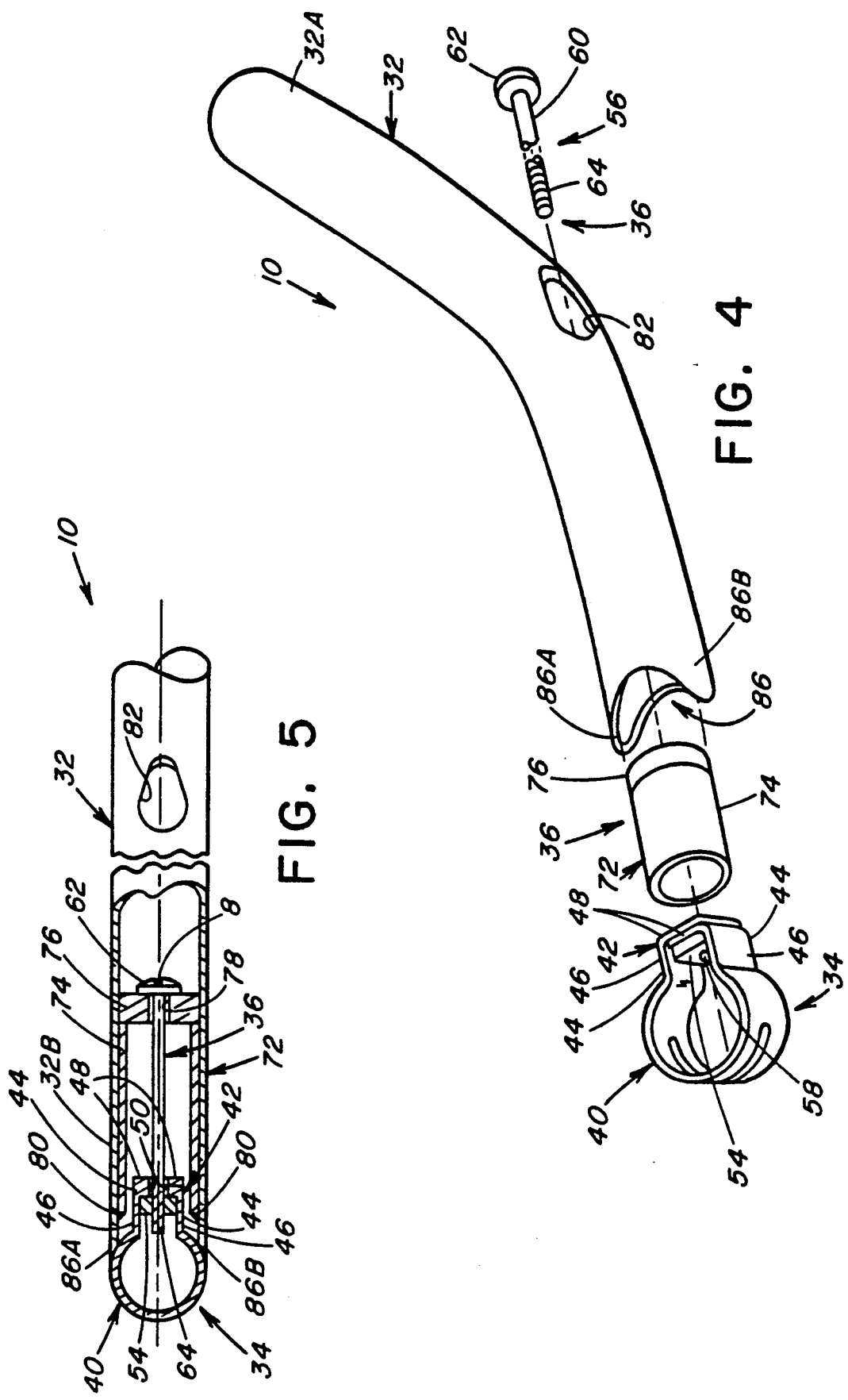

CLAMP-ON AERO BAR WITH INTERNAL CLAMPING MECHANISM FOR ATTACHMENT TO A BICYCLE HANDLEBAR

BACKGROUND OF THE INVENTION

1. Field of the Invention

The present invention generally relates to handlebars for bicycles and, more particularly, is concerned with a clamp-on aero bar with internal clamping mechanisms for attachment to a bicycle handlebar.

2. Description of the Prior Art

Aerodynamic handlebars, also referred to as aero bars, are used on bicycles to reduce frontal area of the riders and thereby improve the aerodynamics of the riders in the tucked racing position. Improved aerodynamics reduces the energy output required and the time it takes to travel given distances.

There are two basic types of aero bars: the full aero bar and the clamp-on aero bar (also known as a clip-on or bolt-on aero bar). The full aero bar replaces the conventional road-style handlebar in its entirety. An advantage of a full aero bar is that brake and shift levers can be mounted on it so that they are accessible even when riding in a full tuck position.

A disadvantage of the full aero bar is that, since it is typically not used for recreational bicycle riding, it is desirable to install it only for bicycle racing and then to remove and replace it with the conventional road-style handlebar. The steps involved in installing and removing the full aero bar are cumbersome and tedious and take a substantial amount of time.

The clamp-on aero bar installs on the conventional road-style handlebar. An advantage of the clamp-on aero bar is that it does not interfere with use of the conventional road-style handlebar whenever the rider desires to use the bicycle for recreational riding.

A disadvantage of the past designs of clamp-on aero bars is that they typically employ externally-adjustable clamps for attaching them to the handlebar and so must be mounted to the straight crosspiece of the handlebar in order to avoid having the clamps obstructing the path of movement of the rider's hands to and from the brake levers. Another disadvantage of the past designs of clamp on aero bars is that the aero bar requires the hands of the rider be placed in front of the steering post and thus far away from the brake levers.

Both types of aero bars reduce the frontal area which creates less wind resistance and thus are advantageous from an aerodynamics standpoint. However, the clamp-on type of aero bar is disadvantageous in that it is attached to the handlebar adjacent the stem which, in conjunction with the rider's hands and arms in an substantially closed, parallel position, increases instability of bicycle steering.

Consequently, a need still exists for improvement of aero bar construction and deployment on a bicycle.

SUMMARY OF THE INVENTION

The present invention provides an improved clamp-on type of aero bar designed to satisfy the aforementioned need. The improved aero bar of the present invention includes a pair of hollow handle adapter portions which retain the advantages of the prior clamp-on aero bars while eliminating their disadvantages and adds significant new advantages. The clamp-on aero bar of the present invention incorporates internally adustable clamping mechanisms in the hollow handle adapter portions which permits mounting on the top portions of the handles of the conventional road-style bicycle handlebar without obstructing the movement of the rider's hands. The hollow handle adapter portions extend therefrom toward one another.

This new placement of the handle adapter portions of the improved clamp-on aero bar permits the rider to assume different hand and arm positions corresponding to different bicycling activities. For bicycle racing, the hands can be placed closer together along the respective handle adapter portions permitting the hands and arms of the rider to assume the more aerodynamically desirable closed parallel position. For bicycle recreational riding, the hands can be placed farther apart adjacent to the outer clamped ends of the respective handle adapter portions permitting the hands of the rider to be more comfortable and the arms of the rider to assume a more open position which places the arms at a more comfortable, anatomically compatiable angle compared to the parallel arm position of the prior clamp-on aero bar designs. The attachment location of the improved clamp-on aero bar improves bicycle steering stability compared to the prior art clamp-on aero bar.

Thus, the entire extent of the improved clamp-on aero bar of the present invention is available for use in tactical hand adjustment and to provide comfort. The present invention thus adds new arm and hand positions while retaining the traditional positions of the prior art clamp-on aero bar and conventional road-style handlebar being useful in recreational riding and racing in competition.

Accordingly, the present invention is directed to an improved clamp-on aero bar for mounting on a road-style handlebar of a bicycle. The improved clamp-on aero bar comprises: (a) a pair of elongated hollow handle adapter portions, each portion having an opening therein; (b) a pair of clip members mountable about a handlebar; and (c) a pair of clamping mechanisms each connected to one of the hollow handle adapter portions and one of the clip members and being adjustable for tightening and loosening the one of the clip members relative to the handlebar, each of the clamping mechanisms being disposed internally of the one of the hollow handle adapter portions such that a tool must first be extended through the opening and into the one handle adapter potion in order to reach and adjust the clamping mechanism.

The hollow handle adapter portions of the aero bar are preferably separate members, although alternatively they can be integral portions of a single member. Each clip member includes an outer portion extending from an open end of a respective one of the hollow handle adapter portions and being capable of insertion over the handlebar and an inner portion extending into the open end of the respective one hollow handle adapter portion and connected with the clamping mechanism. The outer portion of the clip member encircles the handlebar and conforms in configuration thereto so as to provide a substantially obstruction-free connection joint therewith.

Each of the clamping mechanisms includes a pair of spaced apart inner and outer elements disposed internally of the hollow handle adapter portion and respectively movable and fixed in relative thereto, and a connector element extending between nd connecting with the inner and outer elements. The outer element is attached to the one lip member. The hollow handle adapter portion has an open end with a saddle-shaped edge portion for engaging and causing a squeezing action on the outer portion of the clip member such that he outer portion contracts in diameter and tightens about the handlebar.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 2 is an exploded bottom perspective view of a first embodiment of an internally-adjustable clamping mechanism and one of the pair of handle adapter portions of the improved aero bar of the present invention.

FIG. 3 is a fragmentary longitudinal view, partly in section, of the handle adapter portion of FIG. 2, showing the first embodiment of the internally-adjustable clamping mechanism in assembled condition about a top portion of handle of the conventional handlebar.

FIG. 4 is an exploded bottom perspective view of a second embodiment of the internally-adjustable clamping mechanism of one of the pair of handle adapter portions of the improved aero bar of the present invention.

FIG. 5 is a fragmentary longitudinal view, partly in section, of the handle adapter portion of FIG. 4, showing the second embodiment of the internally-adjustable clamping mechanism in assembled condition about the top portion of the handle of the conventional handlebar.

DETAILED DESCRIPTION OF THE INVENTION

Figure 1:
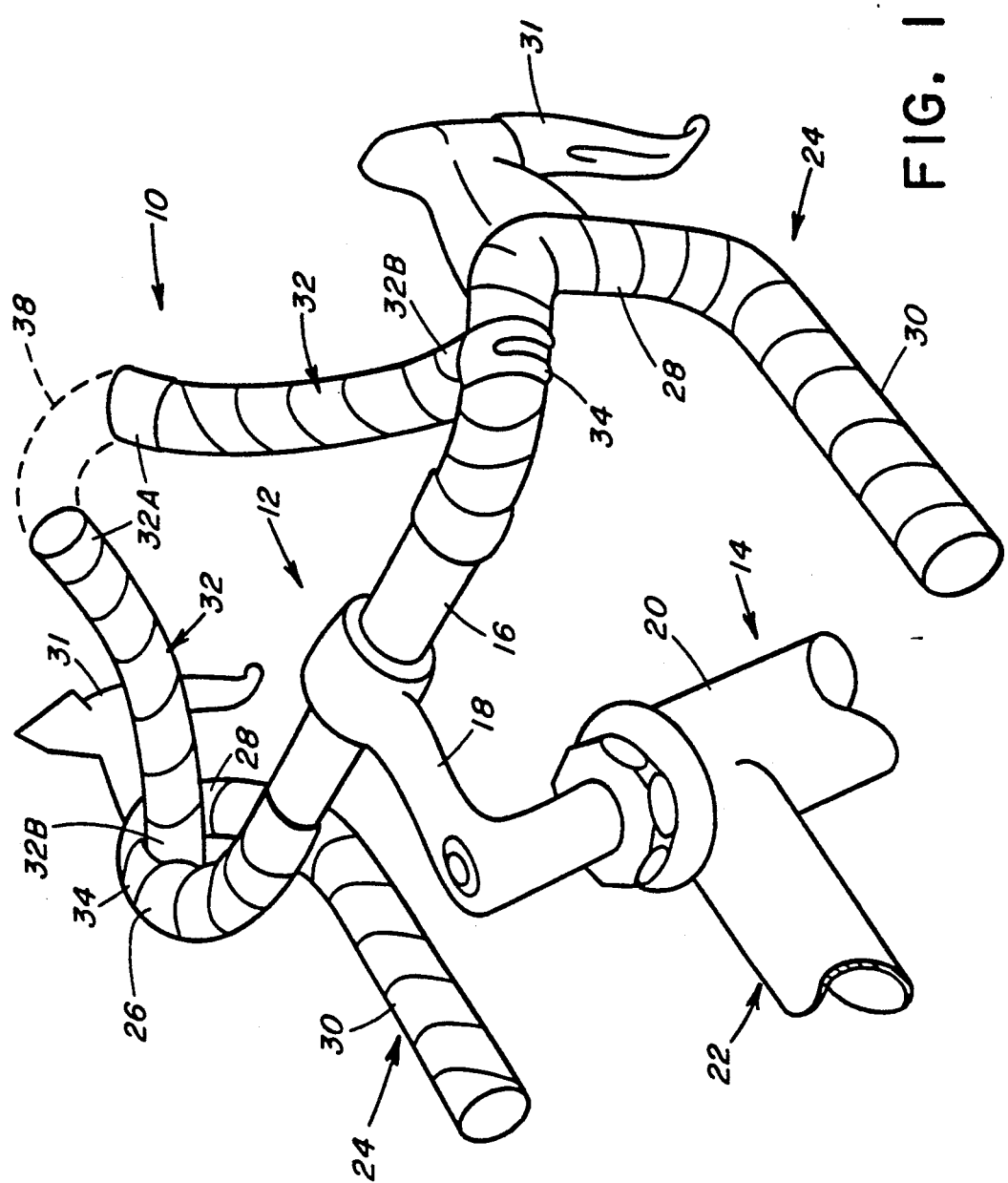
FIG. 1 is a perspective view of a conventional road-style handlebar of a bicycle with an improved clamp-on aero bar constructed in accordance with the present invention mounted thereon.

Referring to the drawings, and particularly to FIG. 1, there is illustrated an improved clamp-on aero bar, generally designated 10, constructed in accordance with the principles of the present invention. As shown in FIG. 1, the improved clamp-on aero bar 10 is particularly suited for mounting on a conventional road-style handlebar 12 of a bicycle 14. The conventional road-style handlebar 12 includes a generally horizontal straight crosspiece 16 for attaching by a stem 18 to a steering post 20 of a bicycle frame 22 and a pair of generally J-shaped handles 24 attached to the opposite ends of the crosspiece 16. Each J-shaped handle 24 has a horizontal top portion 26 extending forwardly from and in transverse relation to the respective opposite end of the crosspiece 16, a vertical middle portion 28 connected to a front end of the horizontal top portion 26 and extending downwardly therefrom, and a horizontal bottom portion 30 connected to the lower end of the vertical middle portion 28 and extending rearwardly therefrom. The bottom portion 30, also referred to as the "drop", is the portion normally gripped by the rider's hand. In its preferred position shown in FIG. 1, the improved aero bar 10 is mounted on the horizontal top portions 26 of the handles 24 of the handlebar 12. Brake levers 31 are typically mounted to and extend forwardly of the vertical middle portions 28 of the handles 24.

Referring to FIGS. 1-5, the improved clamp-on aero bar 10 basically includes a pair of elongated hollow handle adapter portions 32, a pair of clip members 34, and a pair of clamping mechanisms 36. The elongated hollow handle adapter portions 32 of the improved aero bar 10 are preferably separate members as illustrated in solid line form in FIG. 1. However, alternatively, the hollow handle adapter portions 32 can be integral portions of a single bar 38, as shown in dashed line form in FIG. 1. The handle adapter portions 32 can be fabricated from any suitable material, such as by bending conventional hollow aluminum tubing using conventional forming techniques. Each handle adapter portion 32 is preferably curved in shape having a shallow arcuate profile. Preferably, the inner end 32A of the handle adapter portion 32 is closed, whereas the outer end 32B is open. By way of example, each portion 32 has a one inch outside diameter and is nine inches in length and bent on a six inch radius.

Referring still to FIGS. 1-5, the clip members 34 of the improved aero bar 10 are mountable about the handlebar 12, preferably, the horizontal top portions 26 of the handles 24 thereof and attachable by the clamping mechanisms 36 to the hollow handle adapter portions 32. More particularly, each clip member 34 includes an outer portion 40 which extends from the outer end 32B of the respective one hollow handle adapter portion 32 and encircles the handlebar 12 and an inner portion 42 which extends into the outer end 32B of the respective one hollow handle adapter portion 32 and connects with the clamping mechanism 36.

The outer portion 40 of the clip member 34 preferably has the same configuration as the portion of the handlebar 12 encircled by the outer clip member portion 40 so as to provide an essentially obstruction-free mounting or connection joint with the handlebar 12. Usually, this means that the outer clip member portion 40 has a C-shaped or generally cylindrical configuration in view that the handlebar 24 cross-seetionally is the same shape. The outer portion 40 of the clip member 34 is preferably fabricated of a springy, resilient flexible elastic metallic material.

The inner portion 42 of the clip member 34 is formed by a pair of generally L-shaped tabs 44 having respective side legs 46 which extend generally parallel to and are spaced apart from one another and respective end legs 48 which extend generally parallel to and are engaged with one another. The end legs 48 are thus overlapped with one another and have aligned apertures 50 formed therethrough.

Referring to FIGS. 2-5, the clamping mechanisms 36 of the improved aero bar 10 are operable for connecting the hollow handle adapter portions 32 to the respective clip members 34 so as to tighten and clamp the improved aero bar 10 to the horizontal top portions 26 of the handles 24 of the handlebar 12. Each clamping mechanism 36 includes a pair of spaced apart inner and outer elements 52, 54 disposed internally of the hollow handle adapter portion 32 and respectively movable and fixed relative to the hollow handle adapter portion 32, and a connector element 56 extending between and connecting with the inner and outer elements 52, 54. Preferably, the outer element 54 is in the form of a square nut attached upon the end leg 48 of the one tab 44 of the clip member 34 and having an internally-threaded hole 58 therethrough which is aligned with the apertures 50 through the tab end legs 48. Preferably, the connector element 56 is in the form of a bolt having an elongated stem 60 with an enlarged head 62 on one end and being externally-threaded about an opposite end portion 64.

In the first embodiment of the clamping mechanism 36 shown in Figs. 2 and 3, the inner element 52 is a cylindrical plug 66 having a bore 68 extending in a transverse relation therethrough which is large enough to pass the elongated stem 60 of the bolt 56 but not the enlarged head 62 thereof. A pair of aligned holes 70 are formed in opposing relation in the hollow handle adapter portion 32 to receive the cylindrical plug 66 and retain it in a stationary relation to the hollow handle adapter portion 32. The threaded end portion 64 of the bolt 56 can then be threaded into the nut 54 causing the nut to draw toward the plug 66 once the head 62 of the bolt 56 abuts with the plug 66.

In the second embodiment of the clamping mechanism 36 shown in Figs. 4 and 5, the inner element 52 is a cup-shaped retainer 72 having a cylindrical sidewall 74 and a circular end wall 76 attached to one end of the sidewall 74 with a bore 78 extending therethrough comparable to the bore 68 through the above-described cylindrical plug 66. The retainer 72 is installed in the outer end 32B of the hollow handle adapter portion 32 and then permanently attached thereto in any suitable manner, such as by welds 80 to retain the end wall 76 in a stationary relation to the hollow handle adapter portion 32 so that the stem 60 of the bolt 56 can be inserted through the bore 78 of the end wall 76. The threaded end portion 64 of the bolt 56 can then be threaded into the nut 54 causing the drawing of the nut 54 toward the end wall 76 once the head 62 of the bolt 56 abuts the end wall 76.

In order to install and rotate the bolt 56 for tightening and loosening the nut 54 and thereby the clip member 34, an opening 82 is provided at approximately the curved middle section of the hollow handle adapter portion 32. Once the bolt 56 is installed, a tool having a suitable bit end to mate with a correspondingly shaped detent 84 on the head 62 of the bolt 56, such as a screwdriver or an Allen wrench, has to be inserted through the opening 82 and into the hollow handle adapter portion 32 in order to adjust the clamping mechanism 36 by turning the bolt 56 to either tighten or loosen the nut 54 and thereby the outer end 32B of the clip member 32 relative to the handlebar 12.

The advantage of using the internally-adjustable clamping mechanisms 36 is not only the elimination of the bulky external clamps employed by the prior art clamp-on aero bars but also the security against theft of the improved clamp-on aero bar 10 of the present invention which is inherently attained by this construction in view that a suitable tool must be available to extend through the opening 84 and into the one handle adapter portion 32 in order to reach, mate with, and adjust the clamping mechanism 36.

The clamping action of each clip member 32 about the handlebar 12 is caused by a squeezing engagement of the outer cylindrical portion 40 of the clip member 34 with a saddle-shaped (or fish mouth-shaped) edge portion 86 on the outer end 32B of the hollow handle adapter portion 32. The shape of the saddle-shaped edge portion 86 is complementary to and mates with the cylindrical shape of the outer portion 50 of the clip member 34. As the bolt 56 is turned in one direction, it tightens and draws or pulls the nut 56 further into the outer end 32B of the hollow handle adapter portion 32 toward the inner element 52 of the clamping mechanism 36, the oppositely curved projections 86A, 86B of the saddle-shaped edge portion 86 squeeze on the clip member 32 such that its outer portion 40 contracts and assumes a smaller diameter which, in turns, tightens the clamping action of the outer portion 40 about the handlebar 12. Of course, if the bolt 56 is turned in the opposite direction, it loosens and pushes the nut 56 away from the inner element 52 of the clamping mechanism 36, moving the projections 86A, 86B of the saddle-shaped edge portion 86 away from the clip member 32 and allowing the outer portion 40 of the clip member 32 to expand and assume a larger diameter which loosens the clamping action of the outer portion 40 about the handlebar 12.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A road-style bicycle handlebar, comprising:
   (a) a generally straight crosspiece for attaching to a steering post of a bicycle, said crosspiece having a pair of opposite outer ends;
   (b) a pair of generally J-shaped handles connected to said opposite outer ends of said crosspiece, each of said generally J-shaped handles having a generally horizontal top portion extending forwardly from one of said outer ends of said crosspiece and in generally transverse relation thereto, a generally vertical middle portion connected to a front end of said top portion and extending downwardly therefrom, and a generally horizontal bottom portion connected to a lower end of said middle portion and extending rearwardly therefrom; and
   (c) a clamp-on aero bar spaced from said crosspiece and including a pair of elongated curved hollow handle adapter portions being attached to said top portions of said handles of a handlebar at locations spaced forwardly from said opposite outer ends of said crosspiece such that said hollow handle adapter portions extend in generally transverse relation to the top portions of said handles toward one another and in a forwardly spaced relation to said crosspiece.

2. The aero bar of claim 1 wherein each of said hollow handle adapter portions is curved in shape.

3. The handlebar of claim 1 wherein said hollow handle adapter portions are separate members.

4. The handlebar of claim 1 wherein said hollow handle adapter portions are integral portions of a single member.

5. The handlebar of claim 1 wherein said clamp-on aero bar further includes:
   a pair of clip members, each of said clip members being spaced from said crosspiece and mounted about said top portions of said handles; and
   a pair of clamping mechanisms, each of said clamping mechanisms for connecting one of said hollow handle adapter portions with one of said clip members and being adjustable for tightening and loosening said one clip member relative to the handlebar, each said clamping mechanisms being disposed internally of said one hollow handle adapter portion and each of said hollow handle adapter portions having an access opening therein such that a tool must be extended through said access opening and into said one handle adapter portion in order to reach and adjust said clamping mechanism.

6. The aero bar of claim 5 wherein each of said clip members includes:
- an outer portion extending from an open end of a respective one of said hollow handle adapter portions and being capable of insertion over the handlebar; and
- an inner portion extending into said open end of said respective one hollow handle adapter portion and connected with said clamping mechanism.

7. The aero bar of claim 6 wherein said outer portion of said clip member encircles said top portion of said handle and has a configuration the same as said top portion of said handle so as to provide a substantially obstruction-free connection joint therewith.

8. The aero bar of claim 6 wherein said hollow handle adapter portion has an open end with a saddle-shaped edge portion for engaging and causing a squeezing action on said outer portion of said clip member such that said outer portion contracts in diameter and tightens about the handlebar.

9. The aero bar of claim 6 wherein said outer portion of said clip member is generally cylindrical in shape.

10. The aero bar of claim 6 wherein said inner portion of said clip member includes a pair of tabs having respective side legs extending generally parallel to and spaced apart from one another and respective end legs extending generally parallel to and engaged with one another, said end legs being overlapped with one another and have aligned apertures formed therethrough.

11. The aero bar of claim 5 wherein each of said clamping mechanisms includes:
- a pair of spaced apart inner and outer elements disposed internally of said hollow handle adapter portion and respectively movable and fixed relative thereto; and
- a connector element extending between and connecting with said inner element with said outer element, said outer element being attached to a respective one of said clip members.

12. The aero bar of claim 11 wherein said outer element is a nut attached to said clip member and having an internally-threaded hole.

13. The aero bar of claim 12 wherein said connector element is a bolt having an elongated stem with an enlarged head on one end and being externally-threaded about an opposite end portion.

14. The aero bar of claim 13 wherein said inner element is stationarily disposed in said hollow handle adapter portion in alignment between said hole in said nut attached to said clip member and said opening in said hollow handle adapter portion, said inner element having a bore therethrough large enough to pass said elongated stem of said bolt inserted through said opening in said hollow handle adapter portion but not to pass said enlarged head thereof such that said end of said stem can be threaded into said hole of said nut so as to cause drawing of said nut and said clip member therewith toward said hollow handle adapter portion and clamping of clip member about the handlebar.

* * * * *